United States Patent [19]

Miyagi

[11] 4,102,126

[45] Jul. 25, 1978

[54] APPARATUS FOR INTRODUCING SECONDARY AIR INTO AN EXHAUST SYSTEM OF AN INTERNAL COMBUSTION ENGINE

[75] Inventor: Hideo Miyagi, Susono, Japan

[73] Assignee: Toyota Jidosha Kogyo Kabushiki Kaisha, Toyota, Japan

[21] Appl. No.: 756,859

[22] Filed: Jan. 5, 1977

[30] Foreign Application Priority Data

Sep. 21, 1976 [JP] Japan .................................. 51/112419

[51] Int. Cl.$^2$ ............................................... F01N 3/10
[52] U.S. Cl. ......................................... 60/276; 60/289; 60/290
[58] Field of Search ........................... 60/276, 289, 290

[56] References Cited

U.S. PATENT DOCUMENTS

| 3,768,259 | 10/1973 | Carnahan | 60/276 |
| 3,945,205 | 3/1976 | Atago | 60/289 |
| 4,037,406 | 7/1977 | Hartel | 60/276 |

*Primary Examiner*—Douglas Hart
*Attorney, Agent, or Firm*—Stevens, Davis, Miller & Mosher

[57] ABSTRACT

Disclosed is an apparatus for introducing secondary air into an exhaust system of an internal combustion engine, provided with a three-way catalytic converter in the exhaust system. The apparatus includes a flow control valve adapted for controlling the amount of air introduced into the exhaust system in accordance with the atmosphere of the exhaust gas so as to cause it to be kept near a stoichiometric atmosphere, and a pressure control valve adapted for keeping a predetermined constant pressure difference of the secondary air between a position upstream from the flow control valve and a position downstream from the flow control valve. The atmosphere control operation by the flow control valve is effectively promoted by the pressure control valve, so that atmosphere of the exhaust gas can be strictly and precisely controlled to said stoichiometric atmosphere for proper operation of the three-way catalytic converter.

4 Claims, 6 Drawing Figures

APPARATUS FOR INTRODUCING SECONDARY AIR INTO AN EXHAUST SYSTEM OF AN INTERNAL COMBUSTION ENGINE

FIELD OF THE INVENTION

The present invention relates to an appratus for introducing secondary air into an exhaust system of an internal combustion engine provided with a three-way catalytic converter arranged in the exhaust system of the engine.

BACKGROUND OF THE INVENTION

Already known is a three-way catalytic converter, by which three major toxic components (HC, CO and $NO_x$) in the gas exhausted from an internal combustion engine can be eliminated. The operation of this known three-way catalytic converter is effectively attained when an atmosphere of the exhaust gas introduced into the converter is controlled near a stoichiometric atmosphere in which excess air or excess fuel is not substantially left in the exhaust gas, i.e., wherein the excess air ratio $\lambda$ of the exhaust gas is kept near 1.0. However, it is impossible to keep the $\lambda$ near 1.0 in the known carburetor type internal combustion engine and therefore, an effective operation of the known three-way catalytic converter is not expected.

Various types of apparatus have been heretofore proposed for introducing an amount of secondary air into the exhaust pipe of the engine from an air source (for example, an air pump). In these known apparatus, the amount of air introduced into the exhaust pipe is controlled, by an air flow control valve operated by electric signals from a $\lambda$ sensor arranged in the exhaust pipe, in such a manner that the amount of air is increased when $\lambda < 1.0$ (in other words, when an excess of fuel remains in the exhaust gas), and the amount of air is decreased when $\lambda > 1.0$ (in other words, when an excess of air remains in the exhaust gas). As a result of this, controlling the atmosphere of the exhaust gas to the stoichiometric atmosphere (in which $\lambda = 1.0$) can be expected.

However, in these known apparatus, a precise control of the atmosphere cannot be fully expected. This is because, the amount of air introduced into the valve from the air pump, which is directly connected to the air flow control valve, is independent of the amount of secondary air which should be introduced into the exhaust pipe from the valve. Due to this, the difference in the pressure of the secondary air between the flow control valve can not be maintained at a constant value and, thus, an effective atmospheric control operation cannot be expected to be performed by the valve.

SUMMARY OF THE INVENTION

An object of the invention is to provide an apparatus for introducing secondary air into the exhaust system of an internal combustion engine, adapted for controlling the amount of secondary air in such a manner that the $\lambda$ is precisely controlled near 1.0 for the effective operation of the three-way catalytic converter.

Another object of the invention is to provide an apparatus including a pressure control valve, which is arranged between the air pump and the flow control valve, for keeping a constant pressure difference of the secondary air between a position upstream of the flow control valve and a position downstream of the flow control valve.

According to the invention, an apparatus is provided for introducing secondary air into an exhaust system of an internal combustion engine provided with a three-way catalytic converter arranged in the exhaust system, said apparatus comprising:

air pump means driven by the engine;

pipe means which connects said air pump means with the exhaust system at a location situated upstream of said catalytic converter, for introducing an amount of secondary air into the exhaust system;

flow control valve means having a casing arranged between said pipe means and having a valve member arranged in the casing for controlling the amount of secondary air introduced into the exhaust system from the air pump, said valve member being capable of being moved in one direction in order to decrease said amount of secondary air and of being moved in another direction opposite to said one direction in order to increase said amount of secondary air;

sensing means for sensing the atmosphere of the exhaust gas, arranged in the exhausted system in order to provide electrical signals indicating an excess air ratio $\lambda$ of the exhaust gas;

operating means connected to said sensing means for moving said valve member in such a manner that said valve memeber is moved in said one direction for decreasing the amount of secondary air when an electrical signal indicating $\lambda > 1.0$ is transmitted from the sensing means to the operating means and that said valve member is moved in said other direction for increasing the amount of secondary air when another electrical signal indicating $\lambda > 1.0$ is transmitted from the sensing means, so that the atmosphere of the exhaust gas is controlled to a stoichiometric atmosphere in which $\lambda$ is kept near 1.0, and;

pressure control valve means arranged between said pipe means at a location situated between said air pump means and said flow control valve means for keeping a predetermined constant difference between the pressure of the secondary air in said pipe means at a position located upstream of said flow control valve means and the pressure of the secondary air in said pipe means at another position located downstream from said flow control valve means. Due to this, the pressure difference of the secondary air between the flow control valve is kept at a constant value and, therefore, a precise control of the atmosphere of the exhaust gas to said stoichiometric atmosphere by said flow control valve means is effectively attained.

DESCRIPTION OF PREFERRED EMBODIMENTS

Figure 1:
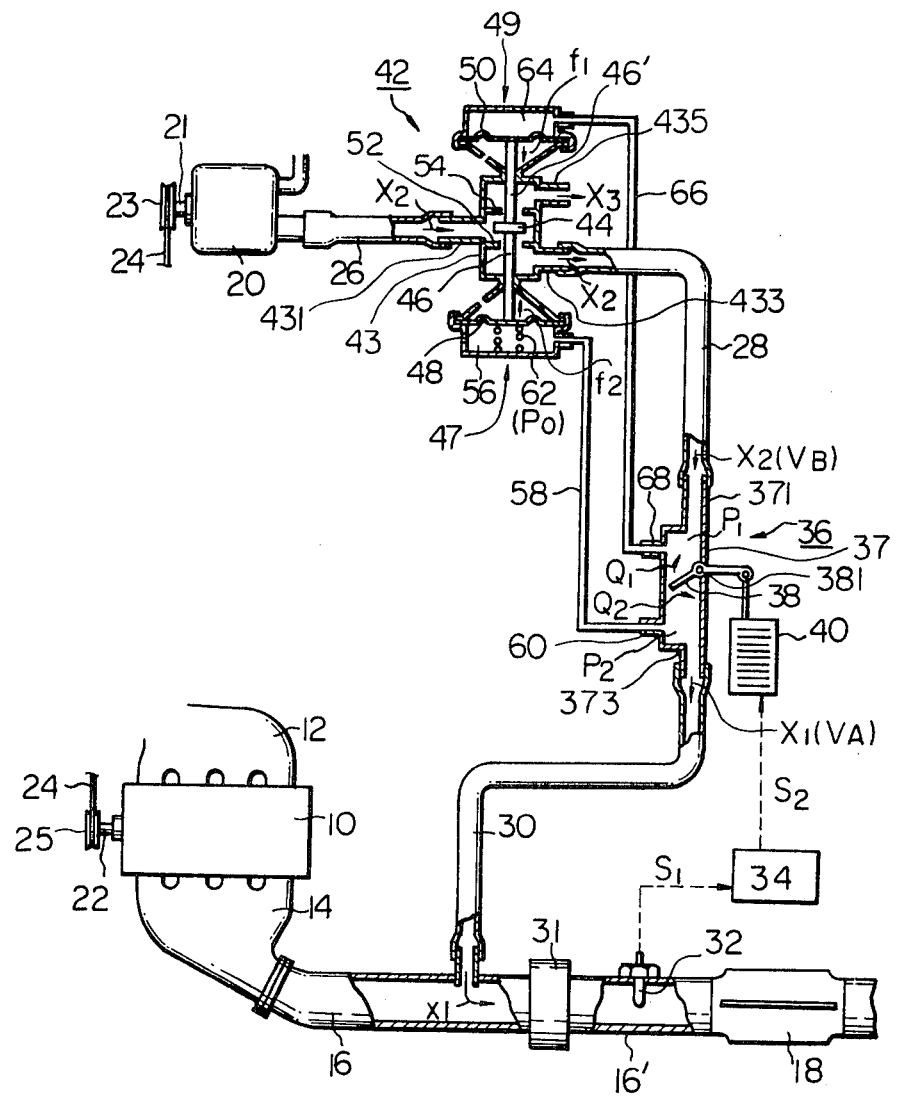
FIG. 1 is a schematic representation of a first embodiment of the present invention.

Referring to FIG. 1, showing a first embodiment according to the invention, numeral 10 designates an engine body of an internal combustion engine. An amount of air-fuel mixture is supplied to not shown combustion chambers in the engine body 10, through an intake manifold 12. Connected to the combustion chambers is an exhaust manifold 14 for receiving resultant exhaust gas. The exhaust gas is introduced into a three-way catalytic converter 18 arranged on an exhaust pipe 16' for cleaning three major toxic components, CO, HC and $NO_x$, remaining in the exhaust gas.

Numeral 20 designates an air pump having a drive shaft 21 connected to a crank shaft 22 of the engine via a pulley 23, a belt 24 and a pulley 25. The air pump 20 operates to supply an amount of secondary air into an exhaust pipe 16, as shown by arrow $X_1$, as will be fully described hereinafter. The thus introduced secondary air is mixed with the exhaust gas in the exhaust pipe 16 by means of a mixing device 31 arranged between the exhaust pipes 16 and 16', and reaches the catalytic converter 18.

Numeral designates a flow control valve adapted for controlling the amount of secondary air introduced into the exhaust pipe 16 as shown by the arrow $X_1$, in such a manner that the atmosphere of the exhaust gas directed to the three-way catalytic converter 18 is controlled to a stoichiometric atmosphere in which the so-called excess air ratio λ is kept near 1.0. The valve 36 has a casing 37 provided with an inlet 371, and outlet 373. The valve 36 also has a valve member 38, arranged in the casing 37, which capable of being pivoted about a pin 281. The output 371 of the valve 36 is connected to the exhaust pipe 16 at a position located upstream of the mixing device 31 via an air pipe 30. To the input 371 of the valve 36, air from the air pump 20 driven by the crankshaft 22 is introduced as shown by arrow $X_2$, as will fully described later.

Figure 2:
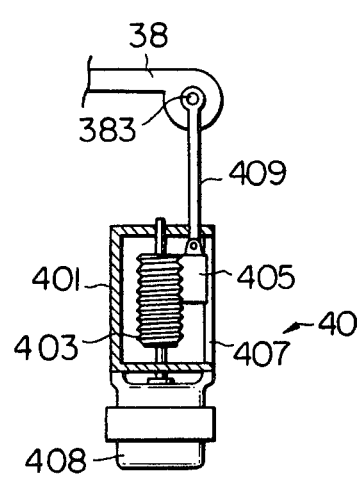
FIG. 2 is a sectional view of the actuator of the flow control valve in FIG. 1.

The valve member 38 is connected to an actuator 40 for moving the valve member 38 so that it pivots in a clockwise direction ($Q_1$) about the pin 381 for decreasing the amount of air $V_A$ passed through the valve 36 toward the exhaust pipe 16 via the pipe 30, or in counterclockwise direction ($Q_2$) for increasing said amount of air $V_A$. The actuator 40, as shown in FIG. 2, has a housing 401 and a worm wheel 403 rotatably mounted in the housing 401. A rack 405 which engages with the wheel 403 is slidably accommodated in a guide groove 407 formed on the inner surface of the housing 401. A rod 409 one end of which is pivoted to the rack 405, extends out of the housing 401. Another end of the rod 409 is pivoted to one end of the valve member 38 about a pin 383. The worm wheel 403 is connected to an electric motor 408 mounted on the housing 401.

As a result of this arrangement, when the electric motor 408 is rotated to rotate the worm wheel 403, the rack 405 is rectilinearly moved along the guide groove 407 in the downward or upward direction according to the direction of the rotation of the electric motor of 408. Due to the rectilinear movement of the rod 409, pivotal movement of the valve member 38 about the pin 381 (FIG. 1) in the clockwise direction $Q_1$ or counterclockwise direction $Q_2$ occurs. This pivotal movement of the valve member 38 is effected at a slow speed because the worm 403 and the rack 405 engaging with the worm wheel 403 are used.

Figure 3:
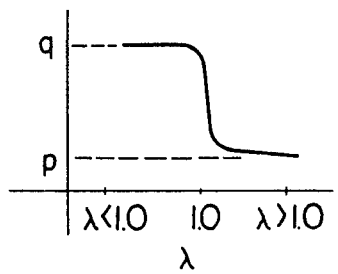
FIG. 3 is a characteristic curve of the $\lambda$ sensor in FIG. 1.

The electric motor 408 (FIG. 2) of the actuator 40 (FIG. 1) is driven by electrical signals from an excess air ratio λ sensor 32 in order to increase or decrease the amount of air $V_A$ introduced into the exhaust pipe 16 in accordance with the excess air ratio λ of the exhaust gas. To this end, the electric motor 408 of the actuator 40 is connected, through a control unit 34, to the sensor 32 which is located upstream of the catalytic converter 18 so that the λ sensor 32 projects into a passageway formed in the exhaust pipe 16' for sensing the atmosphere of the exhaust gas. The λ sensor 32, which is already known, operates to provide electrical signals of both low and high voltages, as shown in FIG. 3. The first signal of a low voltage level $p$ indicates that an excess amount of air remains in the exhaust gas, in other words, $\lambda > 1.0$. The second signal of a high voltage level $q$ indicates that an excess amount of fuel remains in the exhaust gas, in other words, $\lambda > 1.0$.

Figure 4:
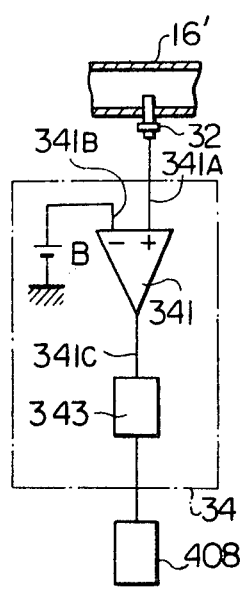
FIG. 4 is a diagrammatic view of the control unit for the flow control valve in FIG. 1.

The control unit 34 has, as shown in FIG. 4, a comparator unit 341 including an input 341A connected to the λ sensor 32, another input 341B connected to a battery B and an output 341C. The comparator unit 341 operates to provide, at the output 341C, a signal of a positive level when the voltage level at the input 341A is higher than the input level at the input 341B, and to privide a signal of a negative level when the input level at the input 341A is lower than the input level at the input 341B. The input level at the input 341B due to the battery B is adjusted so that it is between the voltage levels P and $q$ (FIG. 3). Therefore, the comparator unit 341 provides signals R of a positive level r (FIG. 4a) at the output 341C when $\lambda < 1.0$, while providing the signals S of a negative level-s, when $\lambda > 1.0$. These signals of a positive or a negative level are transmitted to the motor 408 (FIG. 4) via an amplifier unit 343. The motor 403 is rotated so that the rack 405 is slowly moved in the upward direction of FIG. 2, so as to cause a pivotal movement of the valve member 38 in the counterclockwise direction $Q_2$ about the pin 381 in FIG. 1 for increasing the amount of air $V_A$ being passed through the valve 36 as shown by a line $l_1$ in FIG. 4a, when the positive signal R is received by the motor 408. Whereas the motor 408 is rotated so that the rack 405 is slowly moved in the downward direction of FIG. 2, so as to cause a pivotal movement of the valve member 38 in the clockwise direction $Q_1$ about the pin 381 for decreasing said amount of air $V_A$ as shown by a line $l_2$ in FIG. 4a, when the negative signal is received by the motor 408.

Figure 4A:
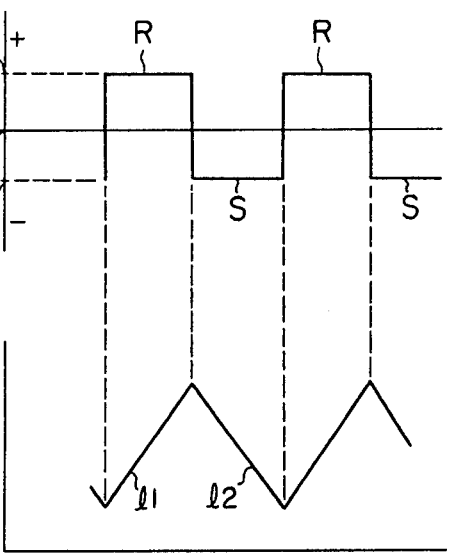
FIG. 4a presents graphs indicating the operation of the main valve in FIG. 4.

As a result of the slow speed movement of the valve member 38 in the counterclockwise direction $Q_2$ when $\lambda < 1.0$ or in the clockwise direction $Q_1$ when $\lambda > 1.0$, the amount of air $V_A$ introduced into exhausted pipe 16 can be increased or decreased at a controlled rate, as shown by line $l_1$ or $l_2$ in FIG. 4a; therefore, control of the atmosphere of the exhaust gas toward the stoichimetric atmosphere in which $\lambda = 1.0$ can be attained.

In the above-mentioned apparatus, described with reference to FIGS. 1 through 4, if the air pump 20 is directly connected to the inlet 371 of the flow control valve 36 in order to introduce secondary air from the air pump as shown by an arrow $X_2$, an idealized atmosphere controlling operation by the valve 36, the actuator 40, the control unit 34 and the λ sensor 32 cannot be expected. This is because there is no relation between the amount of secondary air $V_B$ introduced into the flow control valve 36 as shown by the arrow $X_2$ from the air pump 20 and the amount $V_A$ of secondary air $V_A$ introduced into the exhaust pipe 16 as shown by the arrow $X_1$ from the flow control valve. Due to this, the pressure difference between a pressure $P_1$ of the secondary air at a position located upstream of the valve member 38 of the flow control valve 36 and a pressure $P_2$ of the secondary air at a position located downstream of the valve member 38, is not maintained at a constant value, and thus, it becomes difficult to control the amount of, air $V_A$ so that the atmosphere of the exhaust gas is precisely controlled to the desired stoichiometric atmosphere.

To remedy this difficulty, according to the invention, a pressure control valve 42 is provided between the air pump 20 and the flow control valve 36, in order to obtain a predetermined constant difference between the pressure $P_1$ of the secondary air in the casing 37 at the position located upstream of the valve member 38 and the pressure $P_2$ of the secondary air in the casing 37 at the position located downstream of the valve member 38. The pressure control valve 42 has a casing 43 in which two valve seats 52 and 54 are provided. The casing 43 has a input 431 communicating with a chamber formed in the casing 43 between the valve seats 52 and 54, an output 433 communicating with a chamber formed on the lower side of the valve seat 52, and an output 435 communicating with a chamber formed on the upper side of the valve seat 54. The input 431 is connected to the air pump 20 via an air pipe 26 for introducing air into the pressure control valve 42. The output 433 is connected to the inlet 371 of the flow control valve 36 via an air pipe 28 for introducing air into the valve 36. The output 435 is opened to the atmosphere for discharging extra amounts of air.

The pressure control valve 42 also has a valve member 44 arranged between the valve seats 52 and 54, which member 44 is capable of moving between the valve seats 52 and 54 for introducing a necessary amount of air into the pipe 28 as shown by the arrow $X_2$ via the output 433, and for discharging an extra amount of air into the atmosphere as shown by an arrow $X_3$ via the outlet 435. In order to cause the movement of the valve member 44, it is, on the one hand, connected to a diaphragm actuator 47 mounted on the casing 43 and, on the other hand, connected to another diaphragm actuator 49 mounted on the casing 43 opposite to the actuator 47. The actuator 47 includes a diaphragm 48 connected to the valve member 44 via a rod 46. The diaphragm 48 is arranged across the interior of the actuator 47 so as to form a pressure signal chamber 56 on the lower side of the diaphragm 48. In the chamber 56, a sping 62 is arranged for urging the diaphragm 48 upwardly. The chamber 56 is, via a pressure signal pipe 58, connected to a pressure signal port 60 formed in the casing 37 of the valve 36, in order to transmit pressure signals corresponding said pressure $P_2$ formed in the casing 37 at the location downstream of the valve member 38. The actuator 49 includes a diaphragm 50 connected to the valve member 44 via a rod 46'. The diaphragm 50 is arranged across the interior of the actuator 49 so as to form a pressure signal chamber 64 on the upper side of the diaphragm 50. The chamber 64 is, via a pressure signal pipe 66, connected to a pressure signal port 68 formed in the casing 37 of the valve 36, in order to transmit pressure signals corresponding to said pressure $P_1$ formed in the casing 37 at the location upstream of the valve member.

It should be noted that the diaphragm actuators 47 and 49 have the same design and dimensions, except that the spring 62 is provided only in the actuator 47. The strength of the spring 62 is determined as will be described later.

The operation of the above-mentioned embodiment is as follows.

Since the chamber 64 is connected to the signal port 68 of the flow control valve 36 via the signal pipe 66, the pressure $P_1$ of the air upstream of the valve member 38 causes the generation of a downwardly directed force $f_1$ on the diaphragm 50 as shown in FIG. 1. This force $f_2$ correspond to the pressure $P_1$. Whereas, since the chamber 56 is connected to the signal port 60 via the pipe 58 the pressure $P_2$ of the air downstream of the valve member 38 cases the generation of an upwardly directed force on the diaphram 48 corresponding to the pressure $P_2$. In this case, however, the spring 62 causes the generation of an additional upwardly directed force $P_o$ on the diaphragm 48, which force $P_o$ is determined by the design of the spring 62. Therefore, the total upwardly directed force $f_2$ on the diaphragm 48 corresponds to $P_2 + P_o$.

When the pressure $P_1$ is relatively large with respect to the pressure $P_2$, due to a large amount of air $V_B$ introduced into the flow control valve 36 as shown by the arrow $X_2$ via the outlet 433, the downwardly directed force $f_1$ (corresponding to $P_1$) is larger than the upwardly directed force $f_2$ (corresponding to $P_2 + P_o$). Consequently, in such a case the valve memeber 44 secured to the diaphragms 48 and 50 is moved downwardly toward the valve seat 52, in other words, away from the valve seat 54. This causes the amount of air $V_B$ directed toward the valve member 36 via the outlet 433 to be decreased, while the amount of air discharged through the output 435, as shown by the arrow $X_3$, is increased. As a result of the decrease of the amount of air $V_B$, the pressure $P_1$ is also decreased so that the downwardly directed force $f_1$ (corresponding to $P_1$) is balanced with the upwardly directed pressure $f_2$ (corresponding to $P_2 + P_o$).

When the pressure $P_1$ is relatively small with respect to the pressure $P_2$, due to a small amount of air $V_B$ introduced into the flow control valve 36 as shown by the arrow $X_2$ via the output 433, the downwardly directed force $f_1$ (corresponding to $P_1$) is smaller than the upwardly directed force $f_2$ (corresponding to $P_2 + P_o$). Consequently, in such a case, the valve memember 44 is moved upwardly toward the valve seat 54, in other words, away from the valve seat 52. This causes the amount of air $V_B$ directed toward the valve 36 via the outlet 433 to be increased, while the amount of air discharged through the output 435, as shown by the arrow $X_3$, is decreased. As a result of the increase of the amount of air $V_B$, the pressure $P_1$ is also increased so that the downwardly directed force $f_1$ (corresponding to $P_1$) is balanced with the upwardly directed force $f_2$ (corresponding to $P_2 + P$).

As will be understood from the above description, the pressure control valve 42 operates to balance the force $f_1$ and the force $f_2$, so that the equation $$P_1 = P_2 + P_o$$

is obtained. Therefore, the pressure difference $P_1 - P_2$ is always controlled to a constant value $P_o$, which is determined by the design of the spring 62. In other words, a constant pressure difference of the secondary air upstream and downstream of the valve member 38, of the flow control valve 36, is always obtained by the pressure control valve 42. As a result of this constant pressure difference, an idealized atmosphere controlling operation, to maintain the stoichiometric atmosphere ($\lambda = 1.0$), is obtained by the flow control valve 36, the actuator 40, the control unit 34 and the λ sensor 32. Therefore, an extremely effective gas cleaning operation by the three-way catalytic converter 18 can be obtained.

Figure 5:
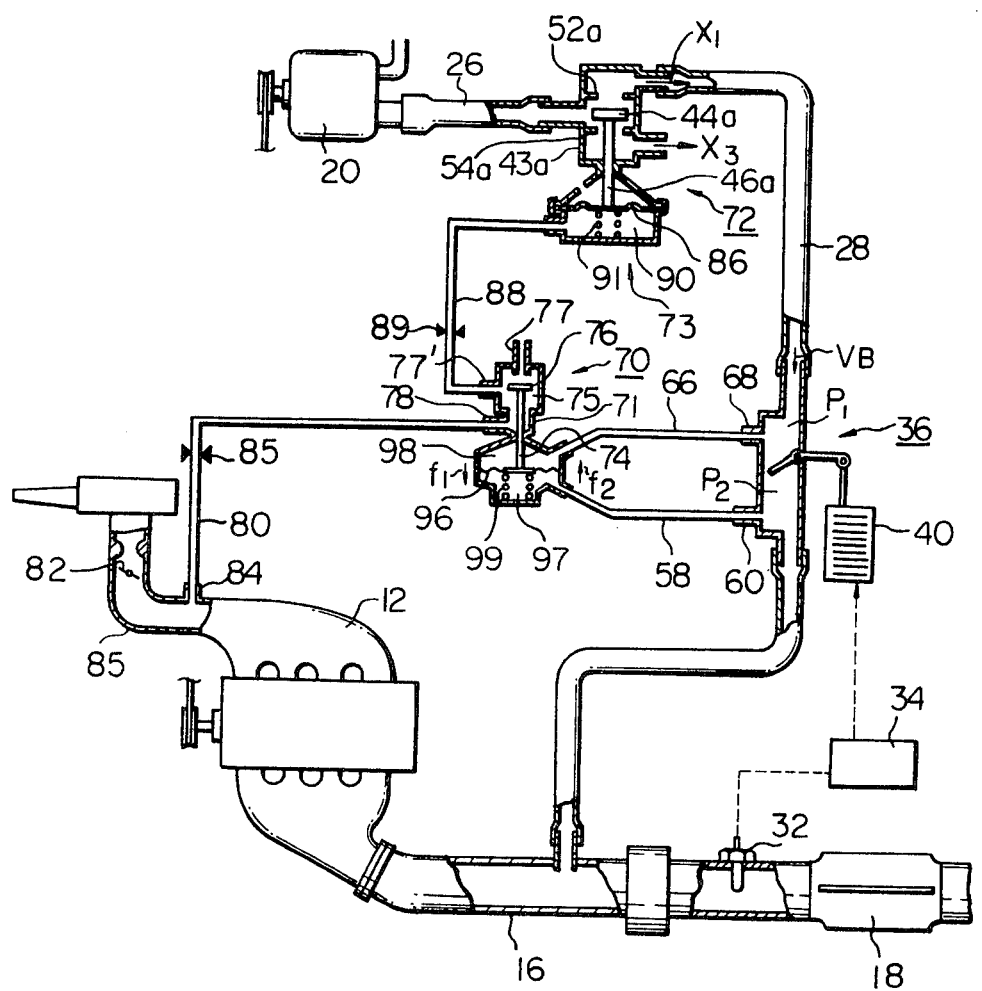
FIG. 5 is a schematic representation of a second embodiment of the present invention.

In another embodiment shown in FIG. 5, a different pressure control device, comprised of a vacuum operated pressure control valve 72 and a vacuum transmitting valve 70, is used for obtaining a constant pressure difference between positions upstream and downstream of a flow control valve 36. The pressure control valve 72 includes:

a casing 43a which has a chamber formed between valve seats 52a and 54a, and connected to an air pump 20 via an air pipe 26;

a chamber connected to a flow control valve 36 via an air pipe 28, and;

a chamber opened to the atmosphere as shown by an arrow $X_3$ in FIG. 5. A valve member 44a arranged between the valve seats 52a and 54a is connected, via a rod 46a, to a vacuum actuator 73. The actuator 73, mounted on the casing 43a, includes a diaphragm 86 connected to the valve memeber 44a by the rod 46a. The diaphragm 86 is arranged across the interior of the actuator 73 so as to form a vacuum chamber 90 on the lower side of the diaphragm 86. In the chamber 90 a spring 91 is arranged for urging the diaphragm 86 upwardly.

The vacuum transmitting valve 70 controls the vacuum level in the chamber 90 of the valve 72. The valve 70 has:

a casing 71 having a chamber 75 provided with a port 77 opened to the atmosphere;

a port 77' communicating with the chamber 90 via a vacuum signal pipe 88, and;

a port 78 communicating with a vacuum port 84 formed in an intake manifold 12 of the engine downstream of a throttle valve 82. The pipe 88 has an orifice 89 for restricting the vacuum level in the chamber 90. The pipe 80 has an orifice 85 for preventing the transmission of atmospheric air into the intake manifold 12 of the engine. A valve member 76 facing the port 77 is, via a rod 74, connected to a diaphragm 96 arranged across the interior of the casing 71 so as to form a chamber 97 on lower side of the diaphragm 96 and a chamber 98 on upper side of the diaphragm 96. The chamber 97, in which a spring 99 urging the diaphragm 96 upwardly is arranged, communicates with a pressure signal port 60 via a pressure pipe 58, in order to transmit pressure signals corresponding to the pressure $P_2$ of the secondary air downstream of the valve 36. The chamber 98 communicates with a pressure signal port 68 via a pressure signal pipe 66, in order to transmit pressure signals corresponding to the pressure $P_1$ of the secondary air upstream of the valve 36. As a result of this, an upwardly directed force $f_2$ corresponding to $P_2 + P_o$ ($P_o$ is a force of the spring 99) and a downwardly directed force $f_2$ (corresponding to $P_1$) is generated on the diaphragm 96, as shown in FIG. 5.

In the operation of the second embodiment, when the pressure $P_1$ is large with respect the pressure $P_2$, due to a large amount of air $V_B$ introduced into the flow control valve 36, so that $f_1 (=P_1) > f_2 (=P_2 + P_o)$, the diaphragm 96 is moved downwardly. This causes the valve member 76 to be detached from the port 77, which results in atmospheric air being introduced, into the vacuum chamber 90 of the valve 72 via the port 77, the chamber 75 and the pipe 88. As a result of this, a sufficient vacuum level at the vacuum port 84 in the exhaust manifold 12 cannot be transmitted to the chamber 90 of the pressure control valve 72. Therefore, the spring 91 urges the diaphragm 86 upwardly, so that the valve member 44a is moved toward the valve seat 52a. Thus, the amount of air $V_B$ directed toward the valve 36 is decreased, which causes the pressure $P_1$ to be decreased. As a result of this, the forces $f_1 (=P_1)$ and $f_2 (=P_2 + P_o)$ are balanced.

When the pressure $P_1$ is relatively small, due to a small amount of air $V_B$, so that downwardly directed force $f_1$ is smaller than upwardly directed force $f_2$, the diaphragm 96 is moved upwardly. This causes the valve 76 to contact so that atmospheric air is prevented from being introduced into the chamber 75. In this case, a sufficient level of vacuum in the intake manifold 12 is transmitted to the chamber 90 via the vacuum port 84, the pipe 80, the chamber 75 and the pipe 88. Thus, the diaphragm 86 is displaced downwardly so that the valve member 44a is moved away from the valve seat 52a toward the valve seat 54a. As a result, the amount of air $V_B$ introduced into the air pipe 28 is increased so as to cause the pressure $P_1$ to be increased and, consequently, the forces $f_1$ and $f_2$ are balanced.

As will be understood from the above description, in this second embodiment the forces $f_1$ and $f_2$ are balanced, so that the equation $$P_1 = P_2 + P_o$$

is obtained. Therefore, the pressure difference $P_1 - P_2$ is always controlled to the constant value $P_o$ determined by the spring 99. Thus, an idealized atmosphere control operation is obtained by the flow control valve 36, the actuator 40, the unit 34 and the λ sensor 32. Therefore, an extremely, efficient exhaust gas cleaning operation by the three-way catalytic convertor 18 can be obtained.

While this invention has been described with reference only to the embodiments, many modifications and changes can be effected by individuals skilled this art without departing from the scope and sprit of the invention.

What is claimed is:

1. An apparatus for introducing secondary air into an exhaust system of an internal combustion engine provided with a three-way catalytic convertor arranged in the exhaust system, said apparatus comprising:

air pump means driven by the engine;

pipe means which connects said air pump means with the exhaust system at a location situated upstream of said catalytic converter, for introducing an amount of secondary air into the exhaust system;

flow control valve means having a casing, arranged between said pipe means and having a valve member arranged in the casing for controlling the amount of secondary air introduced into the exhaust system from the air pump, said valve member being capable of being moved in one direction in order to decrease said amount of secondary air and capable of being moved in another direction opposite to said one direction in order to increase said amount of secondary air;

sensing means for sensing the atmosphere of the exhaust gas, arranged in the exhaust system in order to provide electrical signals indicating an excess air ratio λ of the exhaust gas;

operating means connected to said sensing means for moving said valve member in such a manner that said valve member is moved in said one direction for decreasing the amount of secondary air when an electrical signal indicating $\lambda > 1.0$ is transmitted from the sensing means to the operating means and that said valve member is moved in said other direction for increasing the amount of secondary air when another electrical signal indicating $\lambda < 1.0$ is transmitted from the sensing means, so that the atmosphere of the exhaust gas is controlled to a stoichiometric atmosphere in which $\lambda$ is kept near 1.0, and;

pressure control valve means arranged between said pipe means at a location situated between said air pump means and said flow control valve means for keeping a predetermined constant difference between the pressure of the secondary air in said pipe means at a position located upstream of said flow control valve means and a pressure of the secondary air in said pipe means at another position located downstream from said flow control valve means, whereby a precise control of the atmosphere of the exhaust gas to said stoichiometric atmosphere by said flow control valve means is effectively attained.

2. An apparatus for introducing secondary air according to claim 1, wherein said pipe means comprises a first pipe connecting said air pump with the pressure control valve means and a second pipe connecting said pressure control valve with said flow control vlave means, and wherein said pressure control valve means comprises:

a casing which has a first and a second valve seat therein for forming a first chamber between the first and second valve seats, a second chamber on one side of the first valve seat opposite to said first chamber and a third chamber on one side of the second valve seat opposite to said first chamber, said first chamber communicating with said first pipe for introducing air into the first chamber from said air pump, said second chamber communicating with said second pipe for directing the secondary air into the flow control valve means, said third chamber communicating with the atmosphere for discharging extra amounts of air;

a pressure control valve member arranged in said first chamber, capable of being moved between first and second valve seats for introducing a necessary amount of secondary air into said second chamber from said first chamber and for discharging extra amounts of air into said third chamber from said first chamber, and;

operating means connected to said pressure control member for moving said pressure control valve member between said first and second valve seat in such a manner that a predetermined constant difference is maintained between the secondary air pressure at a first signal port formed in said casing of the flow control valve means so as to be located upstream of the valve member thereof and the secondary air pressure at a second signal port formed in said casing of the flow control valve means so as to be located downstream of the valve member thereof.

3. An apparatus for introducing secondary air according to claim 2, wherein said operating means comprises:

a first diaphragm actuator, mounted on one side of the casing of the pressure control valve means adjacent to the second chamber, having a spring urged diaphragm which is connected to said pressure control valve member and which forms an air pressure chamber on one side of the diaphragm communicating with said second signal port of said flow control valve means, and; a second diaphragm actuator, mounted on another side of the casing of the pressure control valve means adjacent to said third chamber having a diaphragm which is connected to said pressure control valve member and which forms another air pressure chamber on one side of the diaphragm communicating with said first signal port of said flow control valve means.

4. An apparatus for introducing secondary air according to claim 2, wherein said operating means comprises:

a vacuum actuator, mounted on the casing of the pressure control valve means, having a spring urged diaphragm which is connected to said pressure control valve member and which forms a vacuum chamber on one side of the diaphragm, and; a vacuum transmitting valve adapted for selectively introducing a vacuum pressure signal formed in the engine intake system into said vacuum chamber of the vacuum actuator in accordance with said pressure difference between said first signal port and said second signal port.

* * * * *